(12) United States Patent
Vesel

(10) Patent No.: US 7,872,594 B1
(45) Date of Patent: Jan. 18, 2011

(54) RADAR-BASED TERRAIN AWARENESS WARNING SYSTEM ATTENUATION ALERT

(75) Inventor: Andrew M. Vesel, Indialantic, FL (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 268 days.

(21) Appl. No.: 12/156,652

(22) Filed: Jun. 4, 2008

(51) Int. Cl.
*G01S 7/04* (2006.01)
(52) U.S. Cl. ............... 340/970; 340/945; 340/961; 340/968; 342/26 B; 342/51; 342/52; 342/65; 701/9; 701/10; 701/14
(58) Field of Classification Search ............... 340/961, 340/945, 968, 970; 701/9, 10, 14; 342/26 B, 342/51–52, 65
See application file for complete search history.

(56) References Cited

U.S. PATENT DOCUMENTS

| 3,525,095 | A | * | 8/1970 | Cordry | 342/26 B |
| 4,435,707 | A | * | 3/1984 | Clark | 342/26 B |
| 5,047,775 | A | * | 9/1991 | Alitz | 342/26 D |
| 7,633,430 | B1 | * | 12/2009 | Wichgers et al. | 342/65 |
| 7,675,461 | B1 | * | 3/2010 | McCusker et al. | 342/179 |

\* cited by examiner

*Primary Examiner*—Brent Swarthout
(74) *Attorney, Agent, or Firm*—Matthew J. Evans; Daniel M. Barbieri

(57) ABSTRACT

The present disclosure is directed to systems and methods for providing attenuation alerts for a radar-based terrain warning.

A method for providing radar-based terrain warning attenuation alerts may comprise: (a) receiving a radar return; (b) detecting a region of atmospheric disturbance limiting the range of the radar return; and (c) providing a notification of radar-based terrain awareness warning system attenuation in the region of atmospheric disturbance.

12 Claims, 5 Drawing Sheets

RADAR-BASED TERRAIN AWARENESS WARNING SYSTEM ATTENUATION ALERT

BACKGROUND

Terrain awareness systems, such as Terrain Awareness Warning Systems (TAWS), typically provide flight crews with information (e.g., alerts, warnings, displays of terrain data, etc.) related to detection of potentially hazardous terrain situations that pose or may pose a threat to the continued safe flight and landing of an aircraft and provide warnings or alerts in sufficient time for the flight crew to take effective action to prevent a controlled flight into terrain (CFIT). Terrain awareness systems generally have three alerting functions including a Ground Proximity Warning System (GPWS) alerting function, a Forward Looking Terrain Avoidance (FLTA) alerting function, and a Premature Descent Alerting (PDA) function.

Although the GPWS and TAWS have greatly reduced the controlled flight into terrain risk for aviation worldwide, both GPWS and TAWS have limitations. Neither of these systems detects the terrain or other obstructions ahead of the aircraft.

Instead, GPWS may differentiate the aircraft's altitude signals to detect abnormally high closure rates with terrain. However, highly discontinuous terrain profiles, such as a cliff, may not generate an alert in sufficient time to prevent an accident. In addition, non-fixed terrain features and non-fixed terrain threats such as, for example, aircraft or vehicular traffic on the runway, are also not readily determinable by typical ground proximity warning systems.

Similarly, the "look ahead" function of TAWS compares aircraft position data, based on a stored terrain map to calculate the aircraft's probable position relative to the terrain and determine whether a terrain collision threat exists. However, this system cannot detect collision threats due to obstructions not contained within the database (e.g. a construction crane). In addition, the integrity of the TAWS depends directly upon the integrity of the aircraft position data. Errors in aircraft position could reduce the warning time given the flight crew.

An alternative means of compliance with the FAA TAWS forward looking terrain alerting function requirements (which are currently defined in FAA Technical Standard Order ISO C115b) is a Radar-based TAWS (R-TAWS). Such a system uses airborne radar sensors (e.g., similar to the radar that is used for weather and wind shear detection) to detect terrain and/or obstacles that are potentially hazardous to the aircraft rather than or in addition to using a database.

However, the efficacy of an R-TAWS system may be impacted by the presence of intervening weather between an aircraft and a terrain obstacle. As such, it may be desirable to provide an R-TAWS attenuation alert.

SUMMARY

The present disclosure is directed to a method and system for providing an R-TAWS attenuation alert.

A method for providing radar-based terrain warning attenuation alerts may comprise: (a) receiving a radar return; (b) detecting a region of atmospheric disturbance limiting the range of the radar return; and (c) providing a notification of radar-based terrain awareness warning system attenuation in the region of atmospheric disturbance.

It is to be understood that both the foregoing general description and the following detailed description are exemplary and explanatory only and are not necessarily restrictive of the claims. The accompanying drawings, which are incorporated in and constitute a part of the specification, illustrate examples and together with the general description, serve to explain the principles of the disclosure.

BRIEF DESCRIPTION OF THE DRAWINGS

The numerous advantages of the disclosure may be better understood by those skilled in the art by reference to the accompanying figures in which.

DETAILED DESCRIPTION

Figure 1:
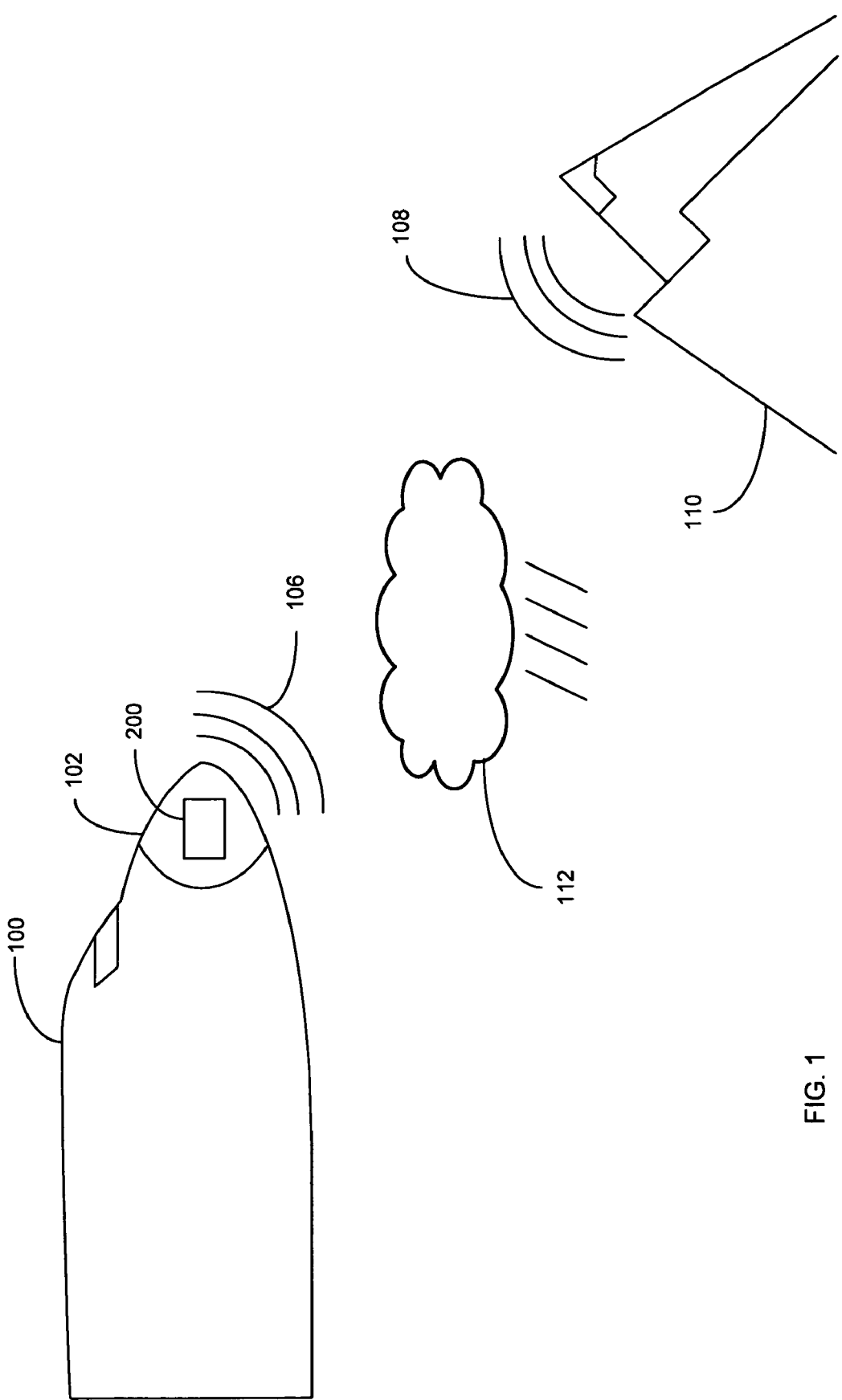
FIG. 1 illustrates a radar-based terrain warning system.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

Referring to FIG. 1, an aircraft 100 includes an aircraft cone section 102, which includes a terrain awareness system, such as an R-TAWS 200. According to one exemplary embodiment, R-TAWS 200 may utilize a broad band directional receiver and active radar for detection of terrain and/or obstacles, for example terrain 110. The terrain 110 may include a tower, for example a radio tower, a television tower, a cellular phone tower, a bridge, a building, or any other structure have sufficient height to intersect a flight path of aircraft 100. The R-TAWS 200 may be configured to detect multiple obstacles or terrain features.

R-TAWS 200 may be configured to transmit a first radio frequency signal 106 in a predetermined pattern. The first radio frequency signal 106 may reflect off terrain 110 to become a second radio frequency signal 108. The second radio frequency signal 108 may be detected by R-TAWS 200.

Either the first radio frequency signal 106 or the second radio frequency signal 108 may be subjected to an intervening region of atmospheric disturbance 112 (e.g. precipitation, airborne particulates, and the like) which may interfere with accurate broadcast and/or reception of either the first radio frequency signal 106 or the second radio frequency signal 108

Figure 2:
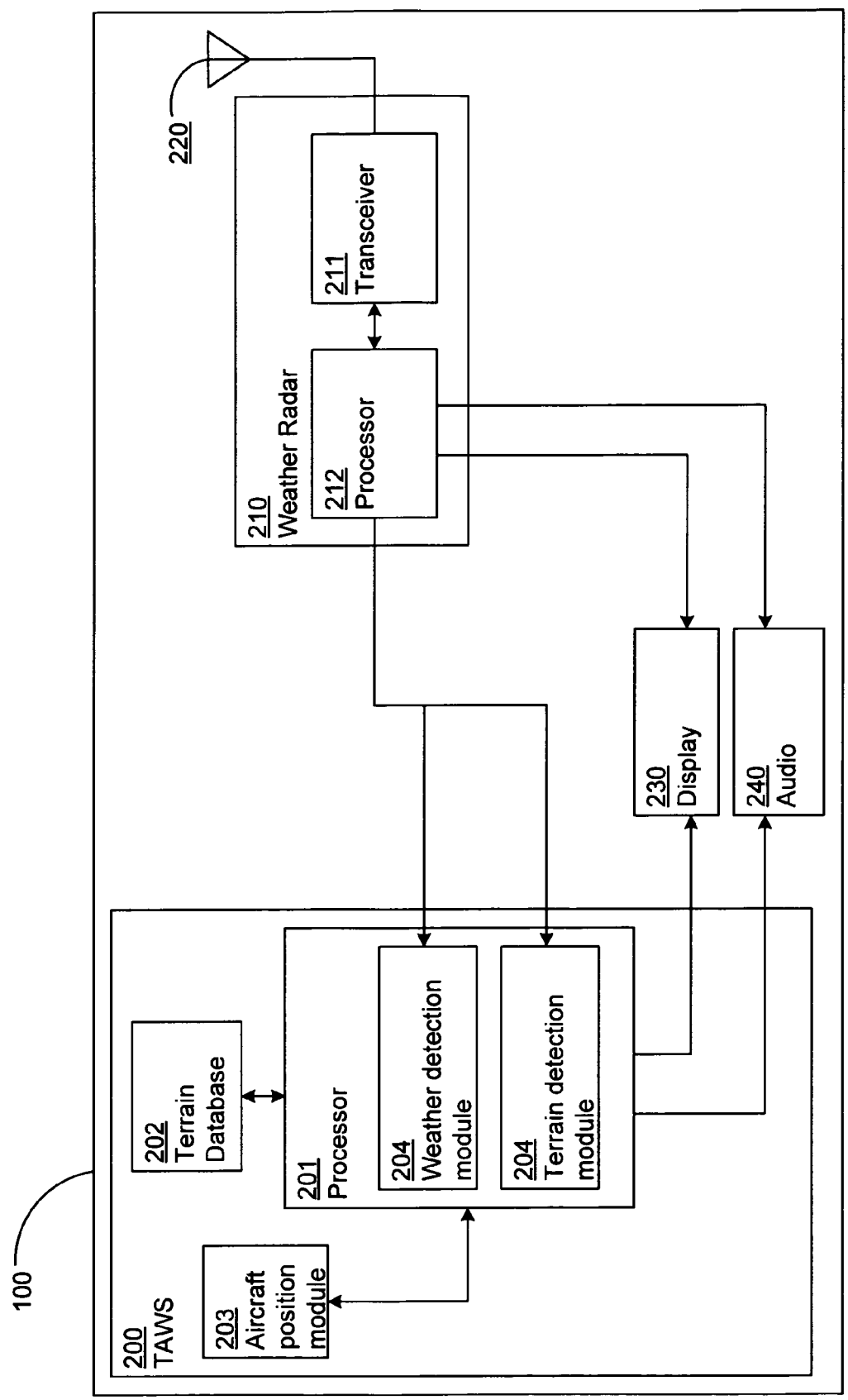
FIG. 2 illustrates a system for providing radar-based terrain warning attenuation alerts.

Referring to FIG. 2, aircraft 100 may include a weather radar system 210, and a radar based terrain warning system (e.g., R-TAWS 200). The weather radar system 210 may include an antenna system 220 capable of casting a radar beam(s) and receiving reflective energy from weather systems, terrain, and other obstacles.

The weather radar system 210 may be similar to the system described in U.S. Pat. No. 6,388,608, incorporated by reference herein in its entirety. Alternately, the weather radar system 210 may be a radar-based wind shear detection system or a monopulse radar system. The weather radar system 210 may be capable of providing terrain elevation estimates or data the R-TAWS 200. According to one embodiment, the terrain elevation estimates are provided real time or almost real time as aircraft 100 is operated.

The weather radar system 210 may include a transceiver circuit 211 and a processor 212. The weather radar system 210 may be coupled to display 230 which can be a multifunction flight display, a dedicated display, or any type of visual indicator and/or an audio system 240, such as a speaker system.

The R-TAWS 200 may include a processor 201, a terrain database 202 and an aircraft position module 203.

The weather radar system 210 may be configured to provide terrain elevation data to the R-TAWS 200 which may, in turn provide terrain warnings or terrain avoidance instructions via display 230 and/or audio system 240.

Although the R-TAWS 200 and weather radar system 210 are shown as distinct systems, they may be provided as a single system or as parts of other distributed systems or other electronics associated with aircraft 100.

The processor 201 of the R-TAWS 200 may utilize any number of techniques for determining or generating terrain elevation estimates. For example, processor 201 may be configured to have weather radar system 210 provide multiple beams swept in azimuth that have different beam elevations. The multiple beams may be used to determine an angle to terrain 110 using the difference in return power to estimate the target angle within the beam. Using the range with both this intra-beam angle and the beam's center angle, the altitude of the terrain 110 can be determined relative to the altitude of aircraft 100 provided by the aircraft position module 203.

In yet another example, antenna system 220 can be controlled in a single azimuth sweep while the data used to support terrain height estimation is taken with either a vertical monopulse antenna (not shown) or vertically orientated sequential lobed antenna (not shown).

In yet another example, the antenna system 220 may employ vertically swept beams using monopulse antennas and receivers to create terrain data or estimates.

The processor 201 of the R-TAWS 200 may receive altitude information from aircraft position module 203 to determine the elevation of the terrain, obstacle or feature of the terrain. The aircraft position module 203 can be a GPS system, an altimeter, radar altimeter, etc.

The processor 201 of the R-TAWS 200 may include a weather detection module 204 for determining the presence of weather in response to weather radar returns and a terrain detection module 205 for determining the presence of terrain and obstacles in response to weather radar returns. The weather detection module 204 and terrain detection module 205 may operate in conjunction with weather radar system 210. R-TAWS 200 may alternate between weather detection and terrain detection during flight of aircraft 100 or utilize antenna/transmitter pulse patterns that may be used for both weather and terrain detection functions. Dual pulse patterns may reduce the total number of antenna sweeps needed to collect the different kinds of needed data (e.g., for wind shear, weather, terrain, obstacle, and runway confirmation).

The R-TAWS 200 may distinguish data that is related to weather detected by weather radar system 210. The R-TAWS 200 may filters or subtracts out returns from the terrain elevation estimates that are associated with weather features but not with terrain features.

For example, an estimated altitude of the feature associated with the weather radar returns can be compared to data maintained in the terrain database 202 to determine if it is weather or terrain feature (e.g., a feature at an unusually high altitude in a known planar region is more likely to be weather than terrain.) R-TAWS 200 can be configured to ignore a feature if its height is well above known parameters (e.g., height is above an error factor for the region).

Alternatively, other radar features and signatures can be utilized to determine whether the return is associated with terrain. Doppler conditions can be monitored to detect movement. Doppler mean frequencies can be estimated from radar return data. The difference between the estimated ground modeled Doppler and the radar derived target estimated Doppler frequency may be used to separate ground returns from weather returns. Alternatively, the radar data may be filtered in the frequency domain to reject weather information.

However, it may be the case that a region of atmospheric disturbance 112 may be of such a degree that the abilities of the R-TAWS 200 to distinguish between terrain and weather are attenuated.

Figure 3:
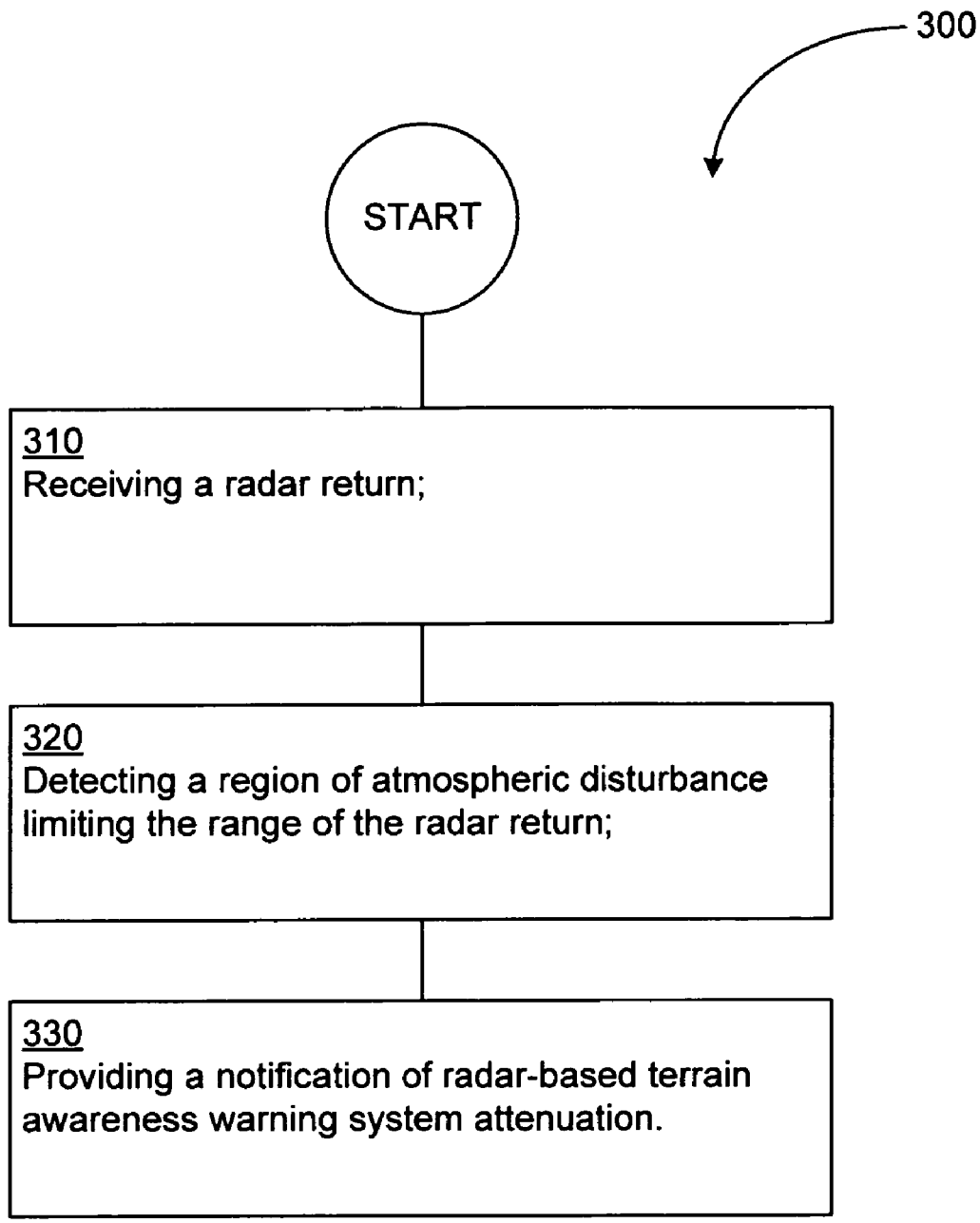
FIG. 3 illustrates a method for providing radar-based terrain warning attenuation alerts.

FIG. 3 illustrates an operational flow 300 representing example operations related to providing notification of an attenuation of the R-TAWS 200. In FIG. 3 and in following figures that include various examples of operational flows, discussion and explanation may be provided with respect to the above-described examples of FIGS. 1 and 2, and/or with respect to other examples and contexts. However, it should be understood that the operational flows may be executed in a number of other environments and contexts, and/or in modified versions of FIGS. 1 and 2. Also, although the various operational flows are presented in the sequence(s) illustrated, it should be understood that the various operations may be performed in other orders than those which are illustrated, or may be performed concurrently.

After a start operation, operation 310 depicts receiving a radar return. For example, as shown in FIGS. 1 and 2, weather radar system 210 may receive a radar return comprising radio frequency signals 108 via antenna system 220.

Operation 320 depicts detecting a region of atmospheric disturbance limiting the range of the radar return. For example, the weather radar system 210 may provide radar return data to the R-TAWS 200. The R-TAWS 200 may detect that the radar return data indicates a region of atmospheric disturbance 112 which may be attenuate future radar returns beyond a threshold level at which the returns are insufficient for the R-TAWS 200 to provide adequate warning regarding any terrain 110 which may be obscured by the region of atmospheric disturbance 112. For example, R-TAWS 200 may maintain a defined threshold distance (e.g. 10 miles) or variable threshold distance (e.g. a function of the speed of the aircraft 100) whereby the terrain 110 may safely navigate around terrain 110. Radar return data indicating that the region of atmospheric disturbance 112 will attenuate the range of the R-TAWS 200 to less than the threshold distance may indicate an area requiring enhanced vigilance by a pilot or altering the course for the aircraft 100. It should be noted that the use of distance as a threshold value is merely exemplary and one skilled in the art will recognize that various other values may be employed in determining radar range limitation.

Operation 330 depicts presenting a notification of radar-based terrain awareness warning system attenuation. Should the R-TAWS 200 receive radar return data indicating that the region of atmospheric disturbance 112 will limit the range of the R-TAWS 200 to less than the threshold value, the R-TAWS 200 may provide a notification to a pilot that the R-TAWS 200 will not be functional in a given geographic area due to the region of atmospheric disturbance 112.

Figure 4:
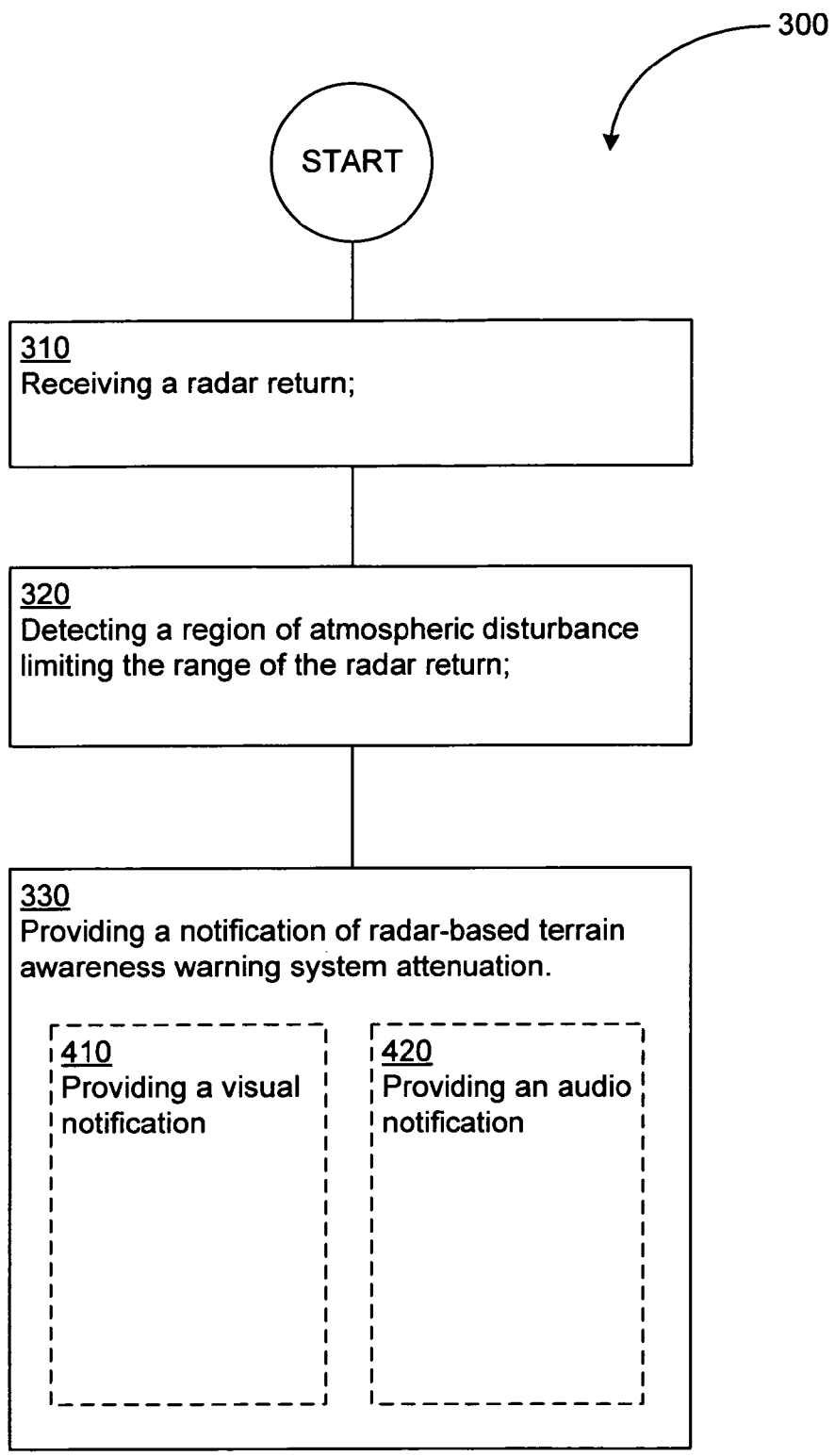
FIG. 4 illustrates a method for providing radar-based terrain warning attenuation alerts.

Referring to FIG. 4, operation 410 depicts presenting a visual notification. For example, the R-TAWS 200 may provide a notification via display 230. The notification may be in the form of an alert LED, a textual or graphical representation, or any other viewable format.

Operation 420 depicts presenting an audio notification. For example, R-TAWS 200 may provide a notification via audio system 240. The notification may be in the form an alert signal, spoken instructions or any other audible format.

Figure 5:
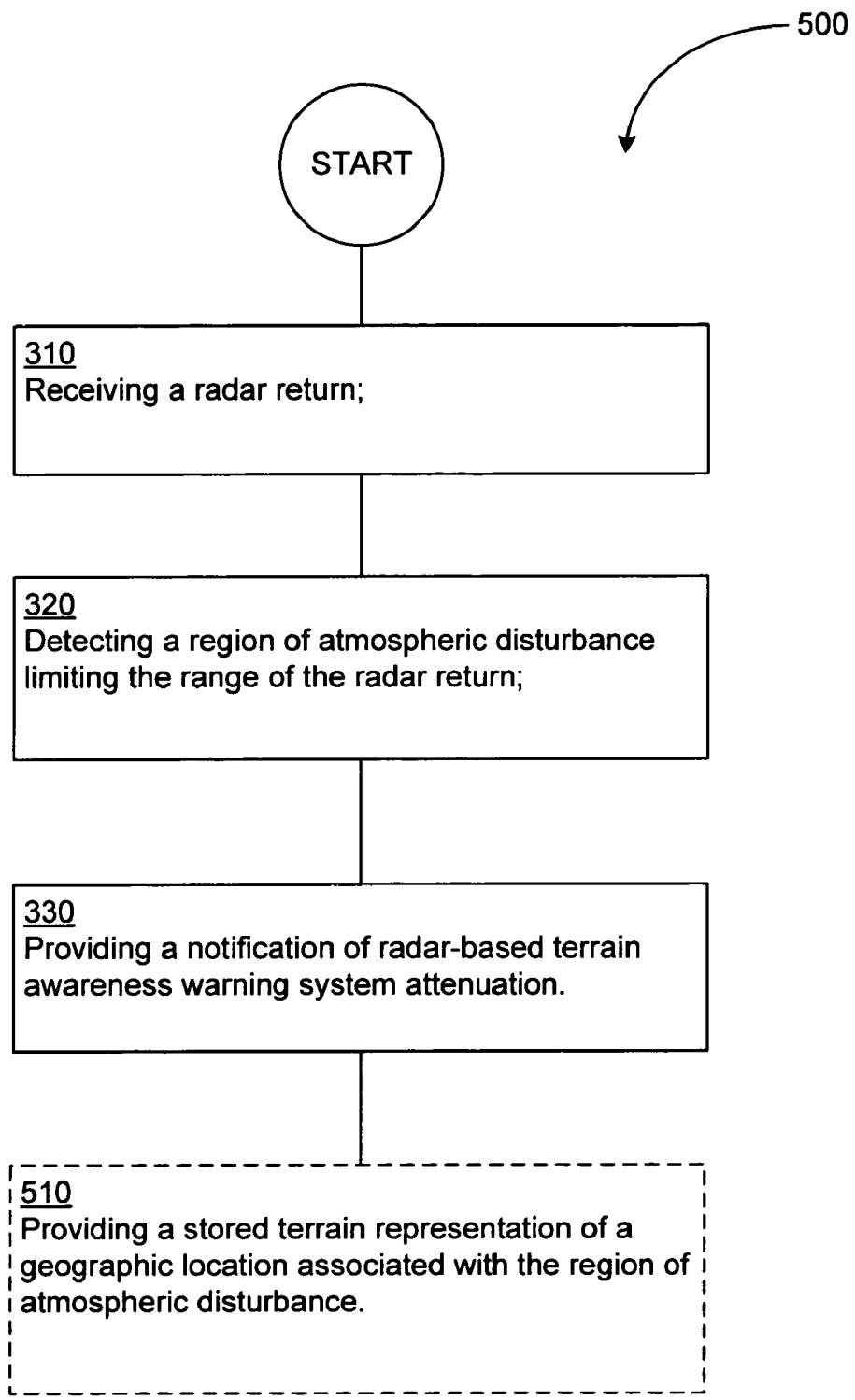
FIG. 5 illustrates a method for providing radar-based terrain warning attenuation alerts.

Referring to FIG. 5, operation 510 depicts presenting a stored terrain representation of a geographic location associated with the region of atmospheric disturbance. For example, if the R-TAWS 200 detects that it may become non-functional due to attenuated radar returns resulting from the region of atmospheric disturbance 112, the R-TAWS 200 may provide an alternate mechanism of terrain awareness warning, such as a graphical representation of the topographical features of the surrounding terrain 110. Particularly, the R-TAWS 200 may compute the location of the region of atmospheric disturbance 112 by correlating the radar returns to a present location of aircraft 100 as determined by the aircraft position module 203. The R-TAWS 200 may then retrieve stored terrain data from the terrain database 202 which may be provided to the pilot (e.g. as an overlay to an existing flight status display or as an independent portion of a multi-function display) to allow a degree of terrain awareness in the absence of the radar based functionality of the R-TAWS 200.

It is believed that the present invention and many of its attendant advantages will be understood by the foregoing description. It is also believed that it will be apparent that various changes may be made in the form, construction and arrangement of the components thereof without departing from the scope and spirit of the invention or without sacrificing all of its material advantages. The form herein before described being merely an explanatory embodiment thereof. It is the intention of the following claims to encompass and include such changes.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure.

In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link (e.g., transmitter, receiver, transmission logic, reception logic, etc.), etc.).

Those having skill in the art will recognize that the state of the art has progressed to the point where there is little distinction left between hardware, software, and/or firmware implementations of aspects of systems; the use of hardware, software, and/or firmware is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

What is claimed is:

1. A method comprising:
   receiving a radar return;
   detecting a region of atmospheric disturbance based on the radar return with a computing device;
   presenting a notification of radar-based terrain awareness warning system attenuation in response to a detection of an atmospheric disturbance.

2. The method of claim 1, wherein the presenting a notification of radar-based terrain awareness warning system attenuation in response to a detection of an atmospheric disturbance further comprises:
   presenting a visual notification of radar-based terrain awareness warning system attenuation in response to a detection of an atmospheric disturbance.

3. The method of claim 1, wherein the presenting a notification of radar-based terrain awareness warning system attenuation in response to a detection of an atmospheric disturbance further comprises:
   presenting an audio notification of radar-based terrain awareness warning system attenuation in response to a detection of an atmospheric disturbance.

4. The method of claim 1, further comprising:
   presenting a stored terrain representation of a geographic location associated with the region of atmospheric disturbance.

5. A system comprising:
   means for receiving a radar return;
   means for detecting a region of atmospheric disturbance based on the radar return;
   means for presenting a notification of radar-based terrain awareness warning system attenuation in response to a detection of an atmospheric disturbance.

6. The system of claim 5, wherein the means for presenting a notification of radar-based terrain awareness warning system attenuation in response to a detection of an atmospheric disturbance further comprises:

means for presenting a visual notification of radar-based terrain awareness warning system attenuation in response to a detection of an atmospheric disturbance.

7. The system of claim 5, wherein the means for presenting a notification of radar-based terrain awareness warning system attenuation in response to a detection of an atmospheric disturbance further comprises:

means for presenting an audio notification of radar-based terrain awareness warning system attenuation in response to a detection of an atmospheric disturbance.

8. The system of claim 5, further comprising:

means for presenting a stored terrain representation of a geographic location associated with the region of atmospheric disturbance.

9. A computer-readable medium having computer readable instructions stored thereon for execution by a processor to perform a method, the method comprising:

receiving a radar return;

detecting a region of atmospheric disturbance based on the radar return;

presenting a notification of radar-based terrain awareness warning system attenuation in response to a detection of an atmospheric disturbance.

10. The computer-readable medium of claim 9, wherein the means for presenting a notification of radar-based terrain awareness warning system attenuation in response to a detection of an atmospheric disturbance further comprises:

presenting a visual notification of radar-based terrain awareness warning system attenuation in response to a detection of an atmospheric disturbance.

11. The computer-readable medium of claim 9, wherein the means for presenting a notification of radar-based terrain awareness warning system attenuation in response to a detection of an atmospheric disturbance further comprises:

presenting an audio notification of radar-based terrain awareness warning system attenuation in response to a detection of an atmospheric disturbance.

12. The computer-readable medium of claim 9, further comprising:

presenting a stored terrain representation of a geographic location associated with the region of atmospheric disturbance.

* * * * *